Patented Oct. 23, 1945

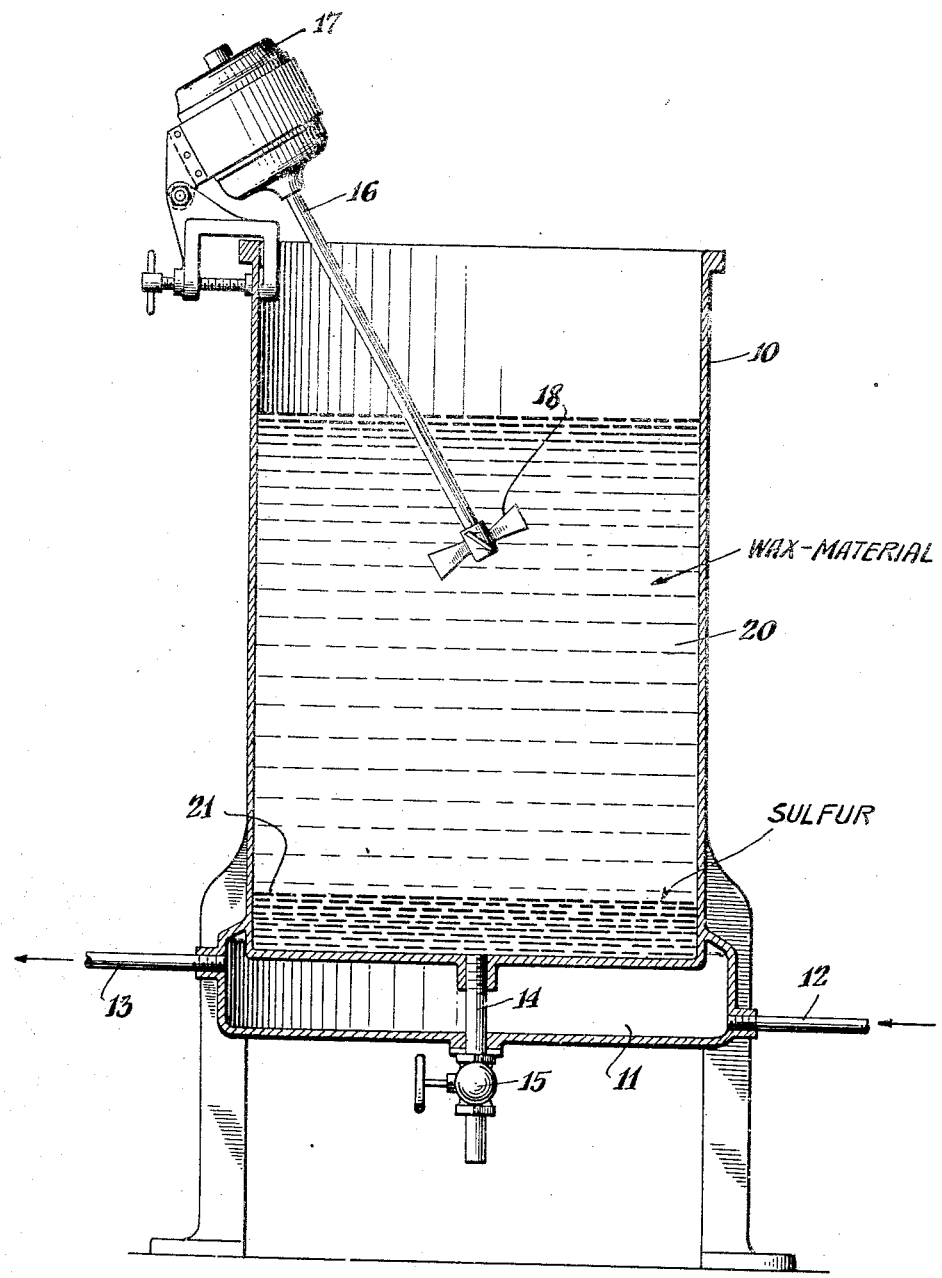

2,387,529

UNITED STATES PATENT OFFICE 2,387,529

MODIFICATION OF MINERAL WAX-TYPE COMPOSITIONS

David E. Pearsall, Avon, Conn., assignor to The Ensign-Bickford Company, Simsbury, Conn., a corporation of Connecticut Application February 8, 1943, Serial No. 475,183

6 Claims. (Cl. 106—230)

This invention relates to the manufacture of pigments, white or light-colored plastic compositions containing sulfur and having increased opacity; and more particularly to mineral wax compositions, such as plastic coating, impregnating, finishing or molding materials as distinguished from solvent dispersions such as cold paints and lacquers or other finishing materials that are applied cold from volatile solvent solutions. An important aspect of the invention relates to the use of mineral waxes, and to plastics comprising a substantial content of mineral wax admixed, for example, with other material such as natural or synthetic resins, gums, other waxes and the like; these mineral waxes and plastics containing them, being herein generically termed mineral wax material. For example, specific instances of particularly valuable mineral wax material to which my present improvements are applicable, are compositions comprising petrolatum stock wax and ester gum, as disclosed in United States Patent No. 1,968,907, issued August 7, 1934, for Composition of matter.

Plastic compositions of the character described are useful for a wide variety of purposes, for instance as water-proofing or moisture-proofing material, or for insulation or insulating coatings, or as coating or impregnating material for paper, textiles and fiber-boards, or for can linings, or as impregnating and potting compounds for electrical equipment such as condensers and the like. A particularly important use is as a waterproofing and protective coating on blasting fuses, e. g. safety fuse or detonating fuse, where a high degree of durability, and permanence under various temperatures and climatic conditions, are important, as well as considerable flexibility.

It is extremely desirable, for many of these and other uses, that the basic plastic composition be as white or light in color as possible, for instance, so that the coated article may be readily identified in a variety of surroundings, or so that it may be dyed or otherwise treated to have an identifying color of useful brilliance or intensity. To the best of my knowledge there are no natural or synthetic waxes, resins or gums which are inherently opaque white. By costly purification or refining, many of these substances may be made colorless and transparent, i. e. so-called water-white, but the resulting material will not produce opaque white or light colored coatings or surfaces, and will exhibit the color of the background over which it is placed, i. e., the underlying article. Some whiteness can be had with very thick layers of colorless material, but such practice is uneconomical, and often undesirable structurally.

In general heretofore, white coatings or surfaces of plastic type materials have been prepared by using the white pigments commonly employed in paints, enamels and plastics, e. g. the oxides of titanium, zirconium and tin, or such pigments extended by combination with various white fillers. These pigments and extenders are relatively inert, forming colloidal suspensions in the plastic base material, and are neither chemically reactive with it nor soluble in it. Furthermore, the incorporation of the pigment usually alters the plastic and other physical properties of the base material in a detrimental manner.

To distribute these pigments in the plastic, it is necessary to resort to milling or grinding, which are relatively time-consuming and costly. The milled vehicle and pigment are then heated to produce a melt for application as a coating, or the milled pigment and vehicle may be molded under heat and pressure (a process not feasible for many coating or impregnating purposes). In coating work, continued heating of a molten mass of the plastic and pigment dispersion tends to settle much of the pigment out of suspension and such settling, although it can be retarded somewhat by agitation, usually impairs or destroys the whiteness of a coating applied from the mass.

Investigation has shown that the brightness and opacity of white pigments in the vehicles in which they are incorporated are the result of a number of factors, the main one comprising the properties of the pigment itself. These pigment properties are: (1) a fine degree of subdivision, i. e. a particle size of microcrystalline or colloidal dimensions; (2) the shape of the particle, i. e. flat, plane particles are better than needle shaped or rounded ones; (3) a high refractive index or indices; and (4) the pigment must have an index of refraction different from the medium in which it is dispersed. The refraction and reflection of incident light from the pigmented plastic increase as the difference between the refractive indices of the medium and the pigment increases; the refraction and reflection—which cause the light sensation of the observer—are functions of the area of the pigment particle and plastic medium interfaces.

An important object of the present invention is thus to provide plastic compositions, of the character described, having a white or light color and at the same time having chemical and physical characteristics which are equivalent or in many cases even superior, to those of the relatively dark-colored plastic base material used. A further object is to provide improved and notably economical procedure for manufacturing or treating such plastic compositions so as to lighten their color in a substantially satisfactory manner; and other and corollary objects are to provide new products and procedure whereby the properties, particularly the color, of relatively inexpensive mineral wax materials may be improved so as to permit their use instead of more expensive or highly refined compositions.

To these and other ends, such as may be hereinafter apparent or incidental to the improved procedure and products, I have discovered that the desired properties, particularly whiteness or brightness, may be attained by a new combination of sulfur in or with the plastic composition, and I have discovered certain novel, satisfactory and relatively simple procedure for so incorporating sulfur, especially in mineral wax material. Extensive tests have indicated that when sulfur is embodied in wax materials in accordance with the present invention, it satisfies criteria that I have found important for the stated purposes, viz. it constitutes a compatible crystalline substance having a definite melting point and a specific gravity which are both higher than those of the plastic being pigmented, and it also has a limited solubility in the wax material and has a refractive index in its solid form, which is higher than the refractive index of the plastic. Although it has heretofore been proposed that not more than quite small amounts of sulfur i. e. from 1% to 2%, might be simply mixed into vegetable type waxes (such as carnauba wax) or like compositions, to effect some lightening of the color of the product, success does not seem to have been attained with any such treatment of mineral wax materials, nor have the prior proposals, so far as I am aware, attained anything like the improved results which are achieved by the present invention. There are also prior procedures for compounding sulfur with plastic materials to vulcanize or harden them, as by adding sulfur and treating the plastic with heat at relatively high temperatures, i. e. above 300° F. But such procedures have no brightening effect at all, and serve to modify the properties of the plastic (as by making it hard or rigid) in a manner generally unsuitable for coating work.

The incorporation of sulfur in accordance with my improved process not only affords a substantial brightening of the mineral wax material, but also usually involves some change, apparently a chemical reaction, in or with the plastic, or especially its mineral wax content, so as to alter the properties of the product beneficially. Thus instead of any elevation of the melting point and in lieu of any hardening effect, the melting point may be slightly reduced and the material is often somewhat softened—an advantage for many purposes—all in a manner contrary to what might be expected from a sulfurizing treatment. Although I do not wish to be bound by any present understanding as to the existence or nature of chemical or other action involved in my procedure, there is thus at least considerable evidence that the process has advantages beyond the very important one of improving color. For instance, where a 60/40 wax-gum mix (e. g. 60 parts of mineral petrolatum wax to 40 parts of ester gum or the like, by weight) may now be required for a specific purpose, it is desirable to employ a less expensive mix, without sacrifice of the properties of the described 60/40 composition. This result may be achieved by reducing the amount of the more expensive wax and increasing the amount of the less expensive gum and by employing a sulfurizing treatment in accordance with my discovery. I have found that in this way the desired properties of the 60/40 mix may be effectively realized, whereas without the sulfurizing treatment, the reduction of the wax-gum ratio would greatly change the properties of the mix, i. e. raising its melting point and increasing its hardness. In other words, the improved treatment has the remarkable effect of softening the mix and lowering its melting point.

My presently preferred mode of effecting the novel combination and incorporation of sulfur, which is found to yield the advantageously permanent and uniform pigmenting properties, involves melting the wax, resin or gum, or mixture thereof, to fluidity, in a suitable container which is preferably heated from the bottom or lower part only. Advantageously, the container may be of a non-jacketed type and in most cases without insulation about its sides; being heated at the bottom only, the container is hottest there and its temperature diminishes toward the top. There is then incorporated with the melted plastic, for example by direct addition to it in the container, a substantial quantity of sulfur, advantageously somewhat more than 5% based on the weight of the plastic and preferably much more, as of the order of 10% to 20%. In general, the amount of sulfur should be in excess of that actually consumed, so to speak, by the complete sulfurizing treatment. The sulfur thus incorporated sinks to, or otherwise accumulates at the bottom of the container, where it becomes established in melted condition, so as to provide a liquid bottom layer upon which the body or layer of liquid plastic is superimposed.

With the preferred method of heating, i. e. only at the bottom of the container, the lower layer will automatically have a higher temperature than the wax material or the major part of the latter, the difference usually amounting to 20° F. or more, depending upon conditions. Application of heat is continued and agitation of the upper body, i. e. the plastic, may be effected from time to time. During this treatment the body of plastic material, according to my present understanding, gradually becomes saturated and supersaturated with respect to the sulfur layer, and upon attaining this condition, the plastic material may be considered as sulfurized and ready for use. Thus upon removing and solidifying the sulfurized wax product (separate from the uncombined remainder of the sulfur layer), it is found to have a white or otherwise substantially lighter or brighter color, and in most cases its properties will have been somewhat modified, for instance as explained hereinabove.

Although a mixed composition, as of mineral wax with a resin or gum, may be directly treated as a mixture by the described procedure, I have found that in many cases there is definite advantage, particularly for decreasing the total required operating time, in treating the wax and the resin or gum separately, i. e. subjecting each of them to sulfurization, and then melting the separately sulfurized materials together. In such case, it is important that the molten resin-sulfur (i. e. the upper body, of resin) be thoroughly stirred during treatment, to prevent local superheating. The molten sulfur thus becomes rapidly dispersed in the liquid resin or gum, the phenomenon appearing to be more of the nature of colloidal suspension or emulsion, than the apparent saturation and combination process which seems to occur between the sulfur and wax. As soon as the sulfur-resin dispersion is complete, the sulfurized wax mix (separately made, as stated above) may be added to it and the heating continued with occasional stirring until reaction is complete.

An alternative method which gives good results is first to sulfurize the resin, in the manner just described but by adding an amount of sulfur sufficient for treatment of both the resin and the wax, i. e., increasing the quantity of sulfur, over that which would be required for treating the resin alone, by an amount which would be used in sulfurizing the wax separately. After the resin is effectively sulfurized, the melted wax is added, directly to the supernatant resin-sulfur body, and the heating and treatment are continued until sulfurization of the resulting resin-wax composition is complete.

Although a wide variety of apparatus may be employed, the accompanying drawing, by way of example, shows principally in vertical section one suitable device for carrying out my process.

Referring to the drawing, the apparatus comprises a vertical tank 10, having a chamber or jacket 11 disposed adjacent to the bottom of the tank and provided with inlet and outlet passages 12, 13 through which a suitable heating medium may be conducted, for instance a heated fluid such as super-heated steam or oil. The bottom of the chamber may also have a draw-off pipe 14 including a valve 15. A stirring device may be provided as shown, comprising a rotating shaft 16 driven by a motor 17 and having appropriate paddles or blades 18, which operate beneath the surface of the material in the tank, the agitator being conveniently clamped to an upper edge of the tank.

As previously explained, the preferred procedure involves establishing a substantial body of molten plastic material 20 in the tank, with sulfur added thereto in such fashion that a separate, molten layer of sulfur 21 is established at the bottom of the tank. It will be observed that with the preferred construction shown, the heat is applied exclusively at the bottom of the tank so that the temperature of the sulfur layer is considerably higher, and there is a definite, decreasing temperature gradient extending upwardly of the molten material in the tank, whereby the temperature of the superposed wax or other plastic body 20 is generally lower than that of the sulfur layer.

By way of a specific example, let it be assumed that it is desired to treat a wax-gum mixture containing (by weight) about 50% of petrolatum stock wax having a melting point of 150° F. or higher, and 50% of ester gum, for instance, of a type made from a light colored rosin and glycerine and having a softening point in the range of about 176° to 187° F. For best results, I have found that a maximum of opaque whiteness for such a petrolatum wax is had by treating it, according to my process, with about 20% of its weight of sulfur, whereas the best results with ester gum appeared to be achieved with about 10% of its weight of sulfur. Accordingly, for a 50–50 wax-gum mix, about five parts of sulfur would be included for each fifty parts of ester gum, and about ten parts of sulfur for each fifty parts of the mineral wax—a total of 15 parts of sulfur for each 100 parts of the wax-gum mix.

It may be noted that other percentages of sulfur will produce satisfactory results if the time and conditions of heating are adjusted accordingly. For example, using the proportions described above, the sulfurization can usually be completed in about one hour. If the amount of sulfur is reduced, the speed of operation or reaction is reduced, thus increasing the time required for completion of the treatment. In general, however, the amount of sulfur added should not be less than about 5% based on the weight of the wax mix. At the same time, addition of sulfur in larger quantities (for ester gum and petrolatum wax) than as specified above, has not been found to accelerate the reaction rate appreciably, although they are not objectionable except economically. The presently preferred amounts of sulfur indicated above represent a considerable excess of the amount actually consumed in the sulfurizing action, an important or greatly preferable feature being to maintain a substantial lower layer of molten sulfur throughout the operation. As a consequence, there is always some sulfur remaining after completion of the reaction; for instance in the above specific example, using 15 lbs. of sulfur for each 100 lbs. of the plastic mix, approximately 5 lbs. of sulfur will be finally incorporated in the plastic, and the rest of the sulfur will remain at the bottom of the tank.

Referring further to the specific example, the wax and ester gum are introduced into apparatus such as the tank 10 of the drawing, and sufficient heat is applied to melt them. Assuming the wax and gum are uniformly mixed, the sulfur, e.g. crude run of mine sulfur, over 99% pure, is added in the preferred amount, and heating is continued. The sulfur melts and having a higher specific gravity (liquid, about 1.8) than the wax-gum mix (sp. gr. about 1.5), accumulates at the bottom of the chamber, in the pool or layer 21, below the wax-gum body 20. It is at present preferred that the applied heat be just sufficient to keep the sulfur layer at a temperature of about 240° to 270° F., thus maintaining it in the form of a yellow liquid, while avoiding such heat, e. g., temperatures over 300° F., as to cause the sulfur to change to a viscous red liquid. By virtue of the described conditions—advantageously including an arrangement such that the depth of the liquid in the container is at least about equal to its horizontal diameter—the application of heat to the wax material comes, almost entirely, through the sulfur layer alone, so that the general temperature of the wax material is preferably about 20° F. or more below that of the sulfur.

Heating is continued as described, for such time as is necessary, and the agitator is operated intermittently in the wax material; occasional stirring seems to accelerate the process. The result of continued heating is apparently to supersaturate the wax material with respect to the sulfur; the appearance of the material at this stage seems to indicate that the hot sulfur vaporizes into the cooler wax body, where it condenses and whence the excess of the sulfur precipitates back to the bottom layer. My present understanding of the complete effect is that there may be some chemical combination of the sulfur, and that some of the sulfur seems to form a saturated solution and some a supersaturated colloidal suspension of sulfur in the wax mix.

As explained above, even better results or at least an acceleration of the complete process, may be had in many cases by sulfurizing the wax and the gum separately—each in the described manner—and then melting and stirring the two sulfurized materials thoroughly together.

As a convenient test, the optimum sulfurizing phenomenon will be found to have been obtained when a drop of the molten wax or wax-gum falling on a cool metal surface turns white immediately after solidifying. The appearance of the sulfurized hot melt at this point may vary from a nearly colorless liquid to a dark reddish-brown liquid. The color of the hot liquid is the result of the degree of heating and does not materially change the appearance of the mix after solidification.

The hot melt may be applied immediately as a wire, cable, safety fuse, detonating fuse, paper or other coating or waterproofing or it may be cast into cakes for future use; i.e. the product, either in its original molten condition, or remelted, may be used in any customary manner. For example, to coat or impregnate insulated wire or fuse, the article may be immersed in the liquid plastic, and then drawn through suitable wiping and sizing dies; or the sulfurized plastic may be applied by dipping, spraying, extruding or spreading. It is advantageous to apply the mix at a fairly low temperature; indeed, within the limits of practical operation, the quicker the transition from liquid to solid, i.e., the faster the cooling of the material upon application, the nearer the resultant color will be to white.

According to my present understanding, and although I do not intend to be bound by such theoretical consideration, the opaque whiteness or brightness of the product is believed to be the result of monoclinic crystallization of the sulfur (which has a refractive index of about 2.0) in the form of extremely fine particles in the wax or wax-gum medium which has a different refractive index (about 1.5) whereby a high degree of light refraction is achieved. Having the higher melting point, the sulfur cools more rapidly than the wax, but experience indicates that the wax (or wax-gum mix) sets up with sufficient rapidity to restrain the crystalline growth of the sulfur and thus kep the sulfur crystals sufficiently minute to provide a maximum degree of whiteness. Experience has also indicated that particularly where the process is operated to achieve super-saturation, i.e. by employing optimum conditions such as indicated above, the sulfur is precipitated (on cooling) in a relatively stable particle size range, so that the results are highly uniform and satisfactorily reproducible.

Referring again to the specific example noted above, embodying a 50-50 mixture, it will be found that although a petrolatum stock wax of only a moderate degree of purity may be used, viz. a wax darker than certain more expensive and more highly refined grades, the resulting product will be at least substantially equivalent in physical properties, and much superior in brightness and color, to a considerably more expensive unsulfurized mix embodying less of the inexpensive gum and a larger quantity of a more costly grade of the wax. At the same time, the product of the present invention has been permanently pigmented to provide a white, very light yellow or other light color; the color and opacity are not impaired by keeping the material in a molten condition, or even by successive remeltings. The operation requires no pigment grinding or milling, and is accomplished with an agent, viz. sulfur, which is less expensive than the ordinary pigments previously referred to. If desired, the sulfurized wax or wax mix may be colored in other colors, with a correspondingly greater brilliance than is otherwise possible. To that end, for example, an oil-soluble dye can be added to the sulfurized molten wax material, and the mass stirred until a uniform color results.

The improved products, embodying mineral wax material and having sulfur permanently combined therein in accordance with the invention, are homogeneous in appearance, and substantially opaque, in contradistinction to their relatively transparent or translucent constituents. The physical properties are eminently satisfactory; for example, sulfurized products made from petrolatum stock wax and ester gum as described above, have an impermeability, durability and flexibility admirably suited for coating and waterproofing such articles as safety fuse and insulated wire. For various uses, the plastic constituents may be mixed in varying proportions, for instance, the wax, say, in the amount of 15 to 95% and the gum in the amount of 5 to 85% of the wax-gum mixture; for preferred realization of the advantages of the invention, the mixture will usually contain at least about 40% of mineral wax, the remainder being compatible thermoplastic material advantageously melting or softening below about 210° F., to avoid retarding the sulfurizing reactions.

It will be appreciated that the improvements are applicable to a variety of different waxes and resin materials. The invention relates particularly to mineral wax material, as described above. It will be understood that the term "mineral wax" itself is intended to define wax and ceraceous materials of mineral origin (usually consisting chiefly of hydro-carbons) and synthetic or other wax-like substances having equivalent characteristics. The important properties of such wax include a micro-crystalline or amorphous structure, a definite high melting point, and a permanent thermoplasticity. The petrolatum stock waxes (for example as identified in my above mentioned United States Patent No. 1,968,907) are important examples of mineral wax; other examples being ceresin and ozokerite, and for some limited uses, paraffin. Montan wax is also a mineral wax, but I do not wish to include it in the compositions hereinafter claimed.

As explained, the product may also include substantial quantities of resins and similar substances or gums, all of which may be conveniently identified, in a generic sense, as resin material. Such material includes natural resins, synthetic resins as produced by reactions such as esterification, condensation, polymerization and adduction, and including substances such as ester gum (preferably ester gums having softening points in the range of about 176°–187° F. and as free as possible from oxidation products and impurities); examples of other materials being rosin, copal gum, and vinyl and cumarone-indene resins. The materials are preferably of permanent thermoplastic nature, meaning that the substance is solid at ordinary temperatures and has a definite melting or softening point above which it assumes the properties of a true or viscous liquid.

The amount of sulfur homogeneously incorporated in my new products is usually equal to at least about 4% of the weight of the plastic material, and preferably, as occurs in the specific examples of treatment of mineral wax and mineral wax materials hereinabove set forth, the product will include sulfur in amount of about 5% or more of the weight of the wax or wax material.

It is to be understood that the invention is not limited to the specific procedures and substances herein above set forth, but may be carried out in other ways and by the use of equivalents, without departure from its spirit.

I claim:

1. The method of modifying a mineral wax, comprising maintaining in a vessel in molten condition a composition including a substantial proportion of mineral wax, maintaining in the same vessel as the molten wax a subjacent layer of molten sulfur, the amount of sulfur being at least 5% of that of the wax material of the upper layer, supplying heat to the molten materials within the vessel to maintain the sulfur layer at a temperature below 300° F. and maintaining a decreasing temperature gradient in the vessel from the bottom sulfur layer to the upper wax layer, continuously heating the molten materials until the upper layer thereof is super-saturated with sulfur, and thereafter rapidly cooling the material of the upper layer to produce a light colored product.

2. The method of making a modified mineral wax containing at least 4% of its weight of sulfur, comprising the steps of heating a mineral wax and sulfur to melt them and give a lower layer of molten sulfur and an upper layer of molten wax material, establishing and maintaining in the molten materials a temperature gradient such that the sulfur is maintained at a temperature not higher than about 300° F. and the temperaure reduces upwardly of the molten materials so that the average temperature of the wax is at least about 20° F. lower than that of the sulfur, continuing the application of heat and the maintenance of said temperature gradient until a drop of the material of the wax layer will harden on a cold surface to form a wax material of a predetermined light color, and rapidly cooling the material of the wax layer to form a light colored product.

3. A method according to claim 2, wherein the wax material consists substantially of thermoplastic resin and a mineral wax other than montan wax, the proportion of said resin being from about 5% to about 85% of the total wax-resin material, and wherein the resin is sulfurated prior to the admixture therewith of the wax.

4. A light colored wax-like product, comprising petrolatum wax, a thermo-plastic resin compatible therewith when these two materials are in molten condition, and at least about 4% sulfur substantially uniformly distributed therethrough in the form of microcrystalline particles of substantially colloidal dimensions.

5. A light colored wax-like product, consisting substantially of petrolatum stock wax, 15 to 95 parts by weight, a thermo-plastic resin compatible with said wax, 85 to 5 parts by weight, and sulfur uniformly distributed throughout the product in microcrystalline particles of colloidal dimensions, at least about 4 parts by weight.

6. A light colored wax-like product, consisting substantially of a mineral wax other than montan wax having a melting point not less than about 150° F., 50 parts by weight, ester gum having a softening range of about 176° to 187° F., 50 parts by weight, and sulfur substantially uniformly distributed throughout the composition and in the form of particles having microcrystalline colloidal dimensions, at least about 4 parts by weight.

DAVID E. PEARSALL.